United States Patent [19]

Shimano

[11] 4,308,761
[45] Jan. 5, 1982

[54] OPERATING LEVER APPARATUS FOR BICYCLE

[75] Inventor: Keizo Shimano, Sakai, Japan

[73] Assignee: Shimano Industrial Company Limited, Osaka, Japan

[21] Appl. No.: 143,359

[22] Filed: Apr. 24, 1980

[51] Int. Cl.³ .................. B62K 23/06; G05G 1/04
[52] U.S. Cl. .................. 74/489; 74/501 R; 403/316
[58] Field of Search .......... 74/488, 489, 501 R; 403/316

[56] References Cited

U.S. PATENT DOCUMENTS 3,733,922  5/1973  Tripp .................. 74/489 X
3,803,941  4/1974  Yoshikawa ............ 74/489 X
4,149,432  4/1979  Costahaude ........... 74/489

Primary Examiner—Allan D. Herrmann
Attorney, Agent, or Firm—Stevens, Davis, Miller & Mosher

[57] ABSTRACT

An operating lever apparatus for a bicycle comprising a bracket and an L-shaped operating lever supported on the bracket. A projection for catching a wire is provided, on the inner face of a wire inserting groove which is connected with a support hole formed in the angular portion of the lever and is open to the bottom face and front face of the angular portion, on the under side of the moving route of the wire on the inner face of the inserting groove.

3 Claims, 5 Drawing Figures

OPERATING LEVER APPARATUS FOR BICYCLE

FIELD OF THE INVENTION

This invention relates to an operating lever apparatus for a bicycle and more particularly to an operating lever apparatus for a bicycle, which operates a wire for a control cable comprising an operating wire with an end member connected thereto and an outer cylinder for guiding the wire thereby to drive operating machines such as the brake, etc. in the bicycle.

BACKGROUND OF THE INVENTION

Generally, an operating lever apparatus for a bicycle is mainly comprised of a bracket mounted on a handle bar and an operating lever pivotally provided on the bracket. The lever being approximately L-shaped is pivotally provided on the bracket with its one-end side as a boss portion and its other-end side as a grip portion, and is provided, in its angular portion, with a support hole which is open to the bottom face and front face of the angular portion to engage the end member of the wire. Also, the bracket has an engagement hole provided therein to support the receiver of an outer cylinder for guiding the wire. The receiver (hereinafter referred to as outer receiver) is supported in the engagement hole without being secured into the engagement hole.

However, when the operating lever apparatus according to the above is engaged with the handle bar, the wire is extended through the engagement hole of the outer receiver in the bracket to engage the end member of the wire into the support hole of the lever and the outer receiver is supported into the engagement hole of the bracket for the setting operation. Since the support hole of the lever is open in the bottom face of the lever, the outer receiver is not secured into the engagement hole of the bracket and no tension force is applied upon the wire, and the wire may come out of the support hole during the setting operation, thus resulting in complicated setting-operation.

Even in a bicycle, wherein the operating lever apparatus is set on the handle lever and the brake is mounted on the bicycle the wire remains unengaged without being tensioned at a condition where the brake shoe is not restored to operating, i.e., where the remaining braking operation occurs. In this case, the wire may become loose and come out of the support hole.

To prevent the wire from being disengaged as described hereinabove, conventionally the outer receiver was secured by a proper fixing means to the bracket to secure the outer cylinder thereby controlling the free motion of the wire so that the wire was prevented from becoming disengaged. However, according to the conventional system of securing the outer receiver to the bracket by a fixing means as described hereinabove, the wire is prevented from becoming disengaged. But the construction is complicated and the end member is required to be secured to the wire after the wire has been inserted into the outer receiver. The mounting operation of the wire with respect to the lever becomes difficult. Also, a fixing operation of securing the outer receiver to the bracket is required, with the result that the entire setting operation as described hereinabove becomes complicated.

DISCLOSURE OF THE INVENTION

The present invention is provided to solve such conventional problems as described hereinabove. An object of the present invention is to provide an operating lever apparatus which does not allow the operating wire to slip off during the setting operation to the bicycle if the outer receiver is not secured to the bracket.

Namely, according to the present invention, in an operating lever apparatus for a bicycle comprising a bracket and a L-shaped operating lever supported on the bracket, a projection for catching the wire is provided, on the inner face of a wire inserting groove which is connected with a support hole formed in the angular portion of the lever and is open to the bottom pace and front face of the angular portion, on the under side of the moving route of the wire on the inner face of the groove.

Thus, according to the present invention, the simple construction can prevent the wire from slipping off without the securing of the outer receiver to the bracket, thus allowing the setting operation to be easily performed by the handle.

DETAILED DESCRIPTION OF THE INVENTION

A brake operating lever apparatus is shown which is engaged with a handle lever H to operate a brake. The brake operating lever apparatus is composed of a bracket 1 and an operating lever 4 supported on the bracket 1, the bracket being provided with a band 2 to be mounted on the handle H and a fixture 3 for tightening the band 2.

Figure 1:
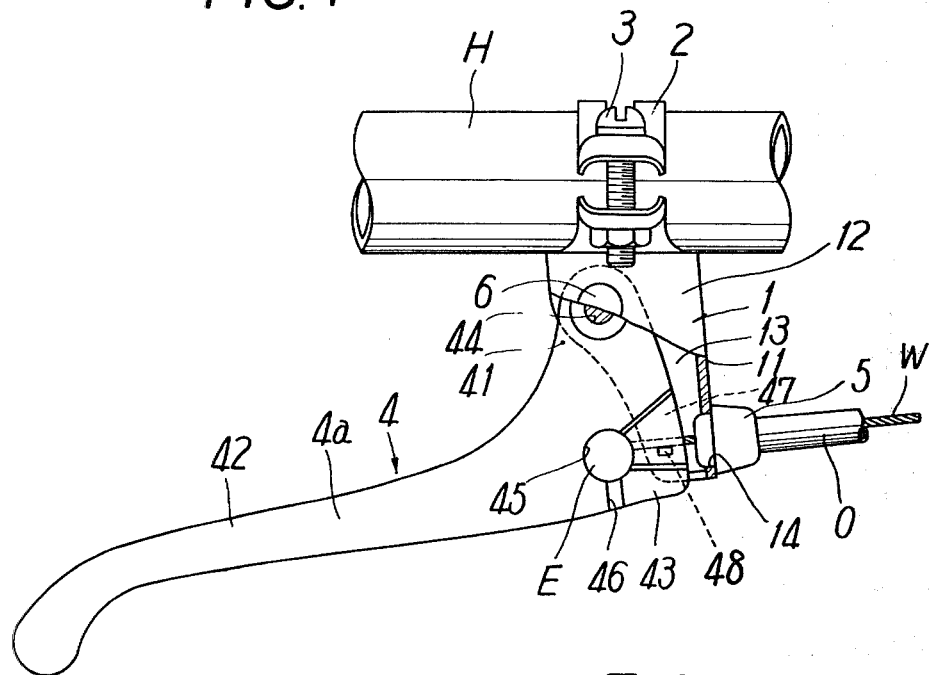
FIG. 1 is a side view of a partially cut-away operating lever apparatus of the present invention.

The bracket 1 is composed of a front wall 11 and a pair of side walls 12, 13, and is open at its rear. The front wall 11 has an engagement hole 14 provided for an outer receiver 5 to be described later. The side walls 12 and 13 have a shaft hole formed therein respectively. Also, the operating lever 4 is composed of a boss portion 41 and a grip portion 42. The front shape of the operating lever 4 is approximately L-shaped as shown in FIG. 1. An angular portion 43 is provided between the boss portion 41 and the grip portion 42. The boss portion 41 has a mounting hole 44 formed therein. A pivotal support shaft 6 is rotatably engaged into the mounting hole 44. The pivotal support shaft 6 is secured into the shaft hole in the bracket 1 to support the lever 4 for free oscillation on the bracket 1. Also, the angular portion 43 has a support hole 45 drilled therein to receive and support an end member E secured to the end of the wire W. An introducing groove 46 for the wire W and an inserting groove 47 for the wire W are formed in the angular portion 43, the introducing groove 46 being connected to the support hole 45 and being open to the bottom face in the angular portion 43. The inserting groove 47 is connected to the support hole 45 and the introducing groove 46, and is open to the bottom face and front face of the angular portion 43. A catching projection 48 for the wire W is formed, on the inner face of the inserting groove 47, on the under side of a moving route for the wire W extending through the inserting groove 47, i.e., on the bottom face side.

However, the wire W is inserted at its end member E into the support hole 45 from one of the side plates. The wire W near the end member E is extended through the introducing groove 46, guided inwardly of the inserting groove 47 from the opening portion in the bottom face of the inserting groove 47 and is inserted as shown in FIG. 1. When the lever 4 is oscillated, the wire W is adapted to move in a given position of the inserting groove 47. Also, the outer receiver 5 is supported in the engagement hole 14 in the front wall 11 of the bracket 1. The outer receiver is secured to the end portion of the outer cylinder 0 or allows the end portion thereof to be inserted without being secured into the engagement hole 14.

A metallic plate is bent into U-shape in section by a pressing operation to form such an operating lever 4 as shown. The operating lever 4 which is approximately L-shaped is composed of a pair of opposite side plates 4a, 4b, and a coupling plate 4c connecting the side plate 4a with the side plate 4b.

Figure 2:
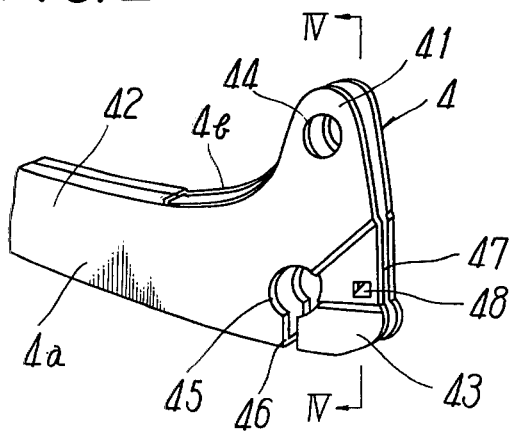
FIG. 2 and FIG. 3 are perspective views each showing a partially omitted operating lever only.

In the grip portion 42, the repective front ends of the side plates 4a and 4b are bent further inwardly as shown in FIG. 2 with the end faces being provided in contact and being closed in section.

Figure 3:
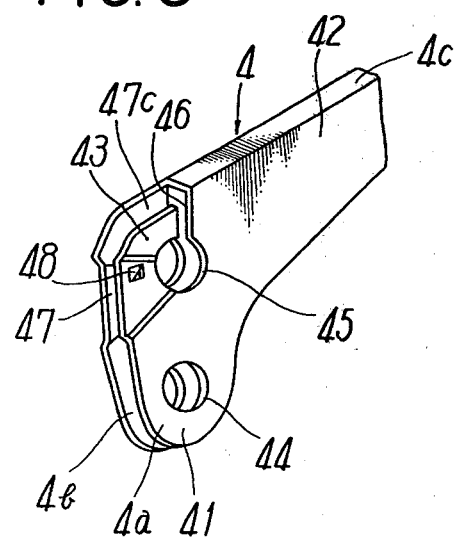

Also, the coupling plate 4c constitutes the bottom face of the lever 4. One side plate 4a of the side plates 4a, 4b and the coupling plate 4c is notched as shown in FIG. 3 to form the introducing groove 46.

Also, the inserting groove 47 is formed in the opposite space relation between the side plates 4a and 4b. The coupling plate 4 is notched at 47a to have the inserting groove 47 open to the bottom face. As shown in the drawing, the front sides of the support hole 45 in the side plates 4a and 4b are inwardly swollen across their given widths so that the space between the side plates 4a and 4b may become narrower than the space therebetween in the boss portion 41.

Figure 4:
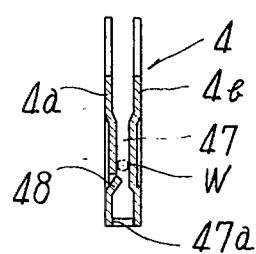
FIG. 4 is a cross-sectional view taken along a line of 1V—1V of FIG. 2.
Figure 5:
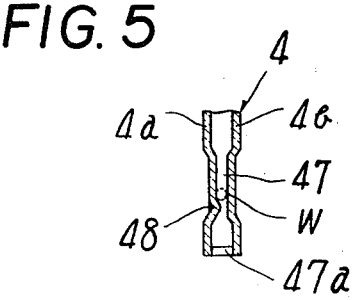
FIG. 5 is a cross-sectional view showing another example of a projection.

Also, the projection 48 formed on the inner face of the inserting groove 47 is inwardly projected from one of the side plates 4a and 4b or from both side plates as shown in FIG. 4. The space between the projection 48 and the other side plate or the space between the projections is made slightly smaller than the diameter of the wire W. The side plates 4a and 4b are cut and raised to form the projections as shown in FIG. 4, or the side plates 4a and 4b are swollen to form projections. When the projections 48 are formed by the cutting and raising operation of the side plates, their tip ends are preferable upwardly directed and inwardly inclined. When the wire W is inserted into the inserting groove 47, one upwardly pulls the wire W, which is inserted from the notch 47a, and the wire can be easily inserted into the inserting groove. Also, when the side plates are swollen to form the projection, a circular swelling is preferred.

However, to use the operating lever apparatus constructed as described hereinabove, the bracket 1 is mounted on the handle bar H of the bicycle through the tightening operation of the band 2 by the fixture 3. During this mounting operation, the operating wire W supported in the lever 4 is adapted to be received by the projection 48 even if the wire tries to come out of the inserting groove 47. The disengagement of the wire W is prevented without fail if the receiver 5 of the outer cylinder 0 is not secured.

In the above-described embodiment, one piece of metallic plate is bent to form an operating lever 4. In the present invention, an operating lever made of aluminum alloy or the like can be used. Even in this case, a support hole 45 and an introducing groove 46 connected to the support hole 45 and being downwardly open are provided in the angular portion 43 of the lever 4 as in the above-described case. A projection 48 for catching the wire is provided on the under side of the inserting groove 47.

According to the present invention as described hereinabove, a projection for catching the wire is provided, on the inner face of the inserting groove formed in the angular portion of the operating lever, on the under side of the moving route of the operating wire. Thus, the wire can be positively prevented from being disengaged when the operating wire is set in the operating lever or when the remaining braking operation has been effected during the damping operation in the case where the bicycle is used with the operating wire mounted thereon.

Also, according to the present invention, since the projection is adapted to directly prevent the wire from being disengaged, a supporter for supporting the outer cylinder to the bracket as before to indirectly prevent the wire from becoming disengaged, is not necessary and the wire is more positively prevented from being disengaged, with a simpler construction as compared with the coventional means. Also, the supporter fixing operation which was conventionally required becomes unnecessary, so that the setting operation of the wire to the operating lever can be easily performed.

As many apparently widely different embodiments of this invention may be made without departing from the spirit and scope thereof, it is to be understood that the invention is not limited to the specific embodiments thereof except as defined in the appended claims.

What is claimed is:

1. An operating lever apparatus for a bicycle, which operates a wire for a control cable comprising an operating wire with an end member connected thereto and an outer cylinder with a receiver for guiding the wire for controlling a mechanism in a bicycle, comprising a bracket and an operating lever supported on the bracket, said bracket having a front wall and a pair of side walls, said front wall having an engaging hole drilled therein to support the receiver of said outer cylinder, said operating lever being L-shaped and being provided with a boss portion and a grip portion, the angular portion of the operating lever having a bottom and front face, said angular portion being provided with a support hole, an introducing groove and an inserting groove, and a projection for catching said wire being provided, on the inner face on said inserting groove, on the under side of the moving route for the wire extending through the inserting groove, said support hole being adapted to receive the end member of said wire, said introducing groove for the wire being connected with said support hole and being open to the bottom face in said angular portion, said inserting groove for the wire being connected with the support hole and the introducing groove and being open to the bottom face and front face of said angular portion.

2. The operating lever apparatus for a bicycle according to claim 1, wherein said operating lever is formed by the bending of a metallic plate and a projection for catching said wire is formed by cutting and raising said metallic plate.

3. The operating lever apparatus for a bicycle according to claim 2, wherein said projection is upward in direction and is inclined inwardly at its top end.

* * * * *

UNITED STATES PATENT AND TRADEMARK OFFICE
CERTIFICATE OF CORRECTION

PATENT NO. : 4,308,761
DATED : January 5, 1982
INVENTOR(S) : Keizo SHIMANO

It is certified that error appears in the above—identified patent and that said Letters Patent is hereby corrected as shown below:

On the title page insert:

--[30] Foreign Application Priority Data
Japan     54-61601     May 8, 1979 --.

Signed and Sealed this

Eighteenth Day of May 1982

[SEAL]

Attest:

Attesting Officer

GERALD J. MOSSINGHOFF
Commissioner of Patents and Trademarks